US012689408B2

(12) United States Patent
Kong et al.

(10) Patent No.: US 12,689,408 B2
(45) Date of Patent: Jul. 21, 2026

(54) DATA TRANSMISSION METHOD, AND POWER LINE COMMUNICATION APPARATUS AND SYSTEM

(71) Applicant: HUAWEI TECHNOLOGIES CO., LTD., Shenzhen (CN)

(72) Inventors: Xuepeng Kong, Dongguan (CN); Dao Pan, Dongguan (CN); Zefeng Lin, Dongguan (CN); Li Xu, Dongguan (CN); Qian Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 18/818,279

(22) Filed: Aug. 28, 2024

(65) Prior Publication Data

US 2024/0421853 A1     Dec. 19, 2024

Related U.S. Application Data

(63) Continuation of application No. PCT/CN2022/133940, filed on Nov. 24, 2022.

(30) Foreign Application Priority Data

Mar. 1, 2022    (CN) .......................... 202210197232.5

(51) Int. Cl.
H04B 3/54            (2006.01)
(52) U.S. Cl.
CPC ..... H04B 3/542 (2013.01); H04B 2203/5404 (2013.01)

(58) Field of Classification Search
CPC . H04B 1/38; H04B 1/713; H04B 3/54; H04B 3/58; H04B 3/542; H04B 15/00;
(Continued)

(56) References Cited

U.S. PATENT DOCUMENTS 8,929,398 B2 * 1/2015 Xu ........................... H04B 3/54
370/252
8,958,464 B2 * 2/2015 Vedantham ........... H04L 5/0094
375/295
(Continued)

FOREIGN PATENT DOCUMENTS

CN        110582989 A    12/2019
WO      2021035652 A1    3/2021

*Primary Examiner* — Shawkat M Ali
(74) *Attorney, Agent, or Firm* — WOMBLE BOND DICKINSON (US) LLP

(57)                ABSTRACT

Embodiments of this application provide a data transmission method applied to power line communication, and a power line communication apparatus and system. The data transmission method includes: a power line node generates a data frame, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data; and the power line node sends the data frame to a node in a power line communication network. According to the data transmission method, data can be efficiently transmitted to a plurality of destination nodes to save bandwidth.

16 Claims, 7 Drawing Sheets

(58) Field of Classification Search
CPC ........ H04J 1/16; H04J 3/16; H04J 3/24; H04J
4/00; H04L 1/00; H04L 5/00; H04L
12/28; H04L 12/40; H04L 29/06; H04W
52/02; H04W 56/00; H04W 72/04
USPC ....... 370/203, 252, 328, 330, 389, 400, 431,
370/437; 375/219, 222, 257, 260, 262,
375/267, 295
See application file for complete search history.

(56)                    References Cited

U.S. PATENT DOCUMENTS

| | | | |
|---|---|---|---|
| 9,584,262 B2 * | 2/2017 | Kim ......................... | H04B 1/38 |
| 10,334,087 B2 | 6/2019 | Xu et al. | |
| 10,681,417 B2 * | 6/2020 | Lee .................... | H04N 21/4627 |

* cited by examiner

700

800

DATA TRANSMISSION METHOD, AND POWER LINE COMMUNICATION APPARATUS AND SYSTEM

CROSS-REFERENCE TO RELATED APPLICATIONS

This application is a continuation of International Application No. PCT/CN2022/133940, filed on Nov. 24, 2022, which claims priority to Chinese Patent Application No. 202210197232.5, filed on Mar. 1, 2022. The disclosures of the aforementioned applications are hereby incorporated by reference in their entireties.

TECHNICAL FIELD

Embodiments of this application relate to the field of power line communication technologies, and in particular, to a data transmission method, and a power line communication apparatus and system.

BACKGROUND

In a conventional power line communication (PLC) technology, to implement transmission of same data from a source device to a plurality of target devices, the source device usually transmits data to the plurality of target devices in a multicast manner.

However, in a process of transmitting the data in the multicast manner, a multicast group usually needs to be created. When the data is transmitted in the multicast manner, the multicast group needs to be created first, and then the data is transmitted to a node in the multicast group. Generally, in a process of establishing the multicast group, the source device needs to send, to a plurality of target devices that become members of the multicast group, information indicating to establish the multicast group, and waits for feedback information of each of the plurality of target devices. When one device does not send the feedback information, the source device repeatedly sends, for a plurality of times, the information indicating to establish the multicast group. As a result, creation of the multicast group takes a long time and occupies a large amount of bandwidth. During the creation of the multicast group, no service data is transmitted, resulting in a serious bandwidth waste. Therefore, in a scenario in which the source device transmits the data to the plurality of target devices, how the source device efficiently transmits the data to the plurality of target devices to save bandwidth becomes a problem that needs to be resolved.

SUMMARY

According to a data transmission method, and a power line communication apparatus and system provided in this application, a power line node can efficiently transmit data to a plurality of destination nodes, to save bandwidth. To achieve the foregoing objective, the following technical solutions are used in this application.

According to a first aspect, an embodiment of this application provides a data transmission method applied to power line communication, where the data transmission method includes: A power line node generates a data frame, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data; and the power line node sends the data frame to a node in a power line communication network.

The first field is, for example, a physical layer frame header field shown in FIG. 2, the second field is, for example, a bitmap field shown in FIG. 2, and the third field may be, for example, a payload field shown in FIG. 2. The identification information of the destination node may be, for example, a registration ID of the destination node. The modulation parameter may include, for example, but is not limited to, a modulation order. According to the data transmission method provided in embodiments of this application, a second field is added to a frame structure, and the identification information of the destination node of the current multicast is carried in the second field. The power line node (for example, a node n1 shown in FIG. 1) may broadcast the data frame to a node in a network based on a pre-established network topology structure. In this case, when transmitting the data frame to the destination node in the network, the power line node may not need to establish a multicast group, that is, does not need to interact with a plurality of nodes for a plurality of times before the service data is sent, and may directly broadcast the data frame to the node in the network. Compared with a conventional technology in which a multicast group is created in a multicast manner, embodiments of this application improve bandwidth utilization in the network. In addition, compared with a conventional technology in which a node in a multicast group cannot be flexibly changed, embodiments of this application can specify any node in the power line communication system to receive the data frame, and improve flexibility of data transmission.

In a possible implementation, that the power line node configures the identification information of the at least one destination node of the current multicast is triggered based on indication information of a received higher-layer instruction, and the indication information indicates the identification information of the at least one destination node.

The data transmission method in embodiments of this application may be applied to, for example, physical layer communication, and the power line node may be a communication apparatus at the physical layer. The higher-layer instruction may be an instruction delivered at any layer above the physical layer, for example, an instruction delivered at an application layer or a data link layer. In an application scenario, the application layer may transmit the identification information of the destination node and to-be-sent data to the power line node at the physical layer through a transport layer, a network layer, and the data link layer. In another possible implementation, hardware modules configured to perform functions of protocol layers may also be integrated together. For example, the power line node may also be configured to perform functions of another protocol layer. This is not limited in embodiments of this application.

In a possible implementation, the second field includes a plurality of bits, and there is a mapping relationship between the plurality of bits and identification information of nodes in the power line communication network; and that the power line node configures the identification information of the at least one destination node of the current multicast includes: The power line node sets a target bit that is in the second field and that corresponds to identification information of each of the at least one destination node as first information, where the first information indicates that the service data is to be read; and sets any bit other than the target bit in the second field as second information, where the second information indicates that the data frame is to be discarded.

In a possible implementation, the identification information of the node in the power line communication network is pre-allocated by the power line node to the node in the power line communication network.

The first information may be, for example, a signal "1", and the second information may be, for example, a signal "0". In addition, the first information may be, for example, a signal "0", and the second information may be, for example, a signal "1". A mapping relationship between each bit in the second field and each node is established, so that the power line node may set a bit that is in the second field and that corresponds to the destination node to "1", and set other bits to "0". This simplifies design of the second field.

In embodiments of this application, a signal carried in the data frame may be modulated in a plurality of manners.

In a first possible implementation, that the power line node sends the data frame to the at least one destination node includes: separately and independently modulating a signal carried by the first field, a signal carried by the second field, and a signal carried by the third field, to generate a plurality of modulated signals; and sending the plurality of modulated signals to the node in the power line communication network.

In this implementation, the first field, the second field, and the third field are independent fields. During signal modulation, the signal carried by the first field, the signal carried by the second field, and the signal carried by the third field may be separately modulated.

In a second possible implementation, that the power line node sends the data frame to the at least one destination node includes: modulating, together with a signal carried by the second field, at least one of a signal carried by the first field and a signal carried by the third field, to generate at least one modulated signal; and sending the at least one modulated signal to the node in the power line communication network.

In this implementation, the first field and the second field may be same fields, and the third field is an independent field. During signal modulation, the signal carried in the first field and the signal carried in the second field may be modulated together, and the signal carried in the third field may be independently modulated; or the second field and the third field may be same fields, and the first field is an independent field. During signal modulation, the signal carried in the second field and the signal carried in the third field may be modulated together, and the signal carried in the first field may be modulated independently; or the signals carried in the first field, the second field, and the third field may be modulated together.

In a possible implementation, the data transmission method further includes: when a length of the second field changes, sending a length of the second field and an identifier that is mapped to each bit in the second field to the node in the power line communication network.

According to a second aspect, an embodiment of this application provides a data transmission method applied to power line communication, where the method includes: A first node in a power line communication network receives a data frame from a power line node, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data; and when the second field indicates that the first node is the destination node, the first node reads the service data from the third field based on the modulation parameter.

The first field is, for example, a physical layer frame header field shown in FIG. 2, the second field is, for example, a bitmap field shown in FIG. 2, and the third field may be, for example, a payload field shown in FIG. 2. The identification information of the destination node may be, for example, a registration ID of the destination node. According to the data transmission method provided in embodiments of this application, a second field is added to a frame structure, and the identification information of the destination node of the current multicast is carried in the second field. The power line node (for example, a node n1 shown in FIG. 1) may broadcast the data frame to a node in a network based on a pre-established network topology structure. In this case, when transmitting the data frame to the destination node in the network, the power line node may not need to establish a multicast group, that is, does not need to interact with a plurality of nodes for a plurality of times before the service data is sent, and may directly broadcast the data frame to the node in the network. Compared with a conventional technology in which a multicast group is created in a multicast manner, embodiments of this application improve bandwidth utilization in the network. In addition, compared with a conventional technology in which a node in a multicast group cannot be flexibly changed, embodiments of this application can specify any node in the power line communication system to receive the data frame, and improve flexibility of data transmission.

In a possible implementation, the data transmission method further includes: discarding the data frame when the second field indicates that the first node is not the destination node.

In a possible implementation, the second field includes a plurality of bits, and there is a mapping relationship between the plurality of bits and identification information of nodes in the power line communication network; when a bit that is in the second field and that corresponds to identification information of the first node is first information, that the first node is the destination node is indicated; or when a bit that is in the second field and that corresponds to identification information of the first node is second information, that the first node is not the destination node is indicated.

In a possible implementation, the first node is a relay node in the power line communication network; and the method further includes: The first node reads, based on the mapping relationship, information about a bit that is in the second field and that corresponds to identification information of a next-level node coupled to the relay node; and when the information about the bit that is in the second field and that corresponds to the identification information of the next-level node is the first information, the first node forwards the data frame to the next-level node.

According to a third aspect, an embodiment of this application provides a power line communication apparatus, where the power line communication apparatus is a power line node, and the power line communication apparatus includes a processor and an interface, where the processor is configured to generate a data frame, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data; and the interface sends the data frame to a node in a power line communication network.

In a possible implementation, that the power line node configures the identification information of the at least one destination node of the current multicast is triggered based on indication information of a received higher-layer instruction, and the indication information indicates the identification information of the at least one destination node.

In a possible implementation, the second field includes a plurality of bits, and there is a mapping relationship between the plurality of bits and identification information of nodes in the power line communication network; and the processor is configured to: set a target bit that is in the second field and that corresponds to identification information of each of the at least one destination node as first information, where the first information indicates that the service data is to read; and set any bit other than the target bit in the second field as second information, where the second information indicates that the data frame is to be discarded.

In a possible implementation, the identification information of the node in the power line communication network is pre-allocated by the power line node to the node in the power line communication network.

In a possible implementation, the processor is further configured to separately and independently modulate a signal carried by the first field, a signal carried by the second field, and a signal carried by the third field, to generate a plurality of modulated signals; and the interface is configured to send the plurality of modulated signals to the node in the power line communication network.

In a possible implementation, the processor is further configured to modulate, together with a signal carried by the second field, at least one of a signal carried by the first field and a signal carried by the third field, to generate at least one modulated signal; and the interface is configured to send the at least one modulated signal to the node in the power line communication network.

In a possible implementation, the processor is further configured to: when a length of the second field changes, send a length of the second field and an identifier that is mapped to each bit in the second field to the node in the power line communication network through the interface.

According to a fourth aspect, an embodiment of this application provides a power line communication apparatus, where the power line communication apparatus is a first node in a power line communication network, and the power line communication apparatus includes a processor and an interface, where the interface is configured to receive a data frame, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data; and the processor is configured to: when the second field indicates that the first node is the destination node, demodulate the service data from the third field based on the modulation parameter.

In a possible implementation, the processor is further configured to discard the data frame when the second field indicates that the first node is not the destination node.

In a possible implementation, the second field includes a plurality of bits, and there is a mapping relationship between the plurality of bits and identification information of nodes in the power line communication network; when a bit that is in the second field and that corresponds to identification information of the first node is first information, that the first node is the destination node is indicated; or when a bit that is in the second field and that corresponds to identification information of the first node is second information, that the first node is not the destination node is indicated.

According to a fifth aspect, an embodiment of this application provides a power line communication system, where the power line communication system includes the power line communication apparatus according to the third aspect and the power line communication apparatus according to the fourth aspect.

According to a sixth aspect, an embodiment of this application provides a computer-readable storage medium, configured to store a computer program. When the computer program is run by a processor, the data transmission method according to the first aspect or the data transmission method according to the second aspect is implemented.

According to a seventh aspect, an embodiment of this application provides a computer program product. When the computer program product runs on a processor, the data transmission method according to the first aspect or the data transmission method according to the second aspect is implemented.

It should be understood that the technical solutions in the second aspect to the seventh aspect of this application are consistent with the technical solutions in the first aspect of this application, beneficial effects achieved by the aspects and corresponding feasible implementations are similar, and details are not described again.

BRIEF DESCRIPTION OF DRAWINGS

To describe technical solutions in embodiments of this application more clearly, the following briefly introduces accompanying drawings for describing embodiments of this application. It is clear that the accompanying drawings in the following description show only some embodiments of this application, and a person of ordinary skill in the art may still derive other drawings from these accompanying drawings without creative efforts.

DESCRIPTION OF EMBODIMENTS

Figure 1:
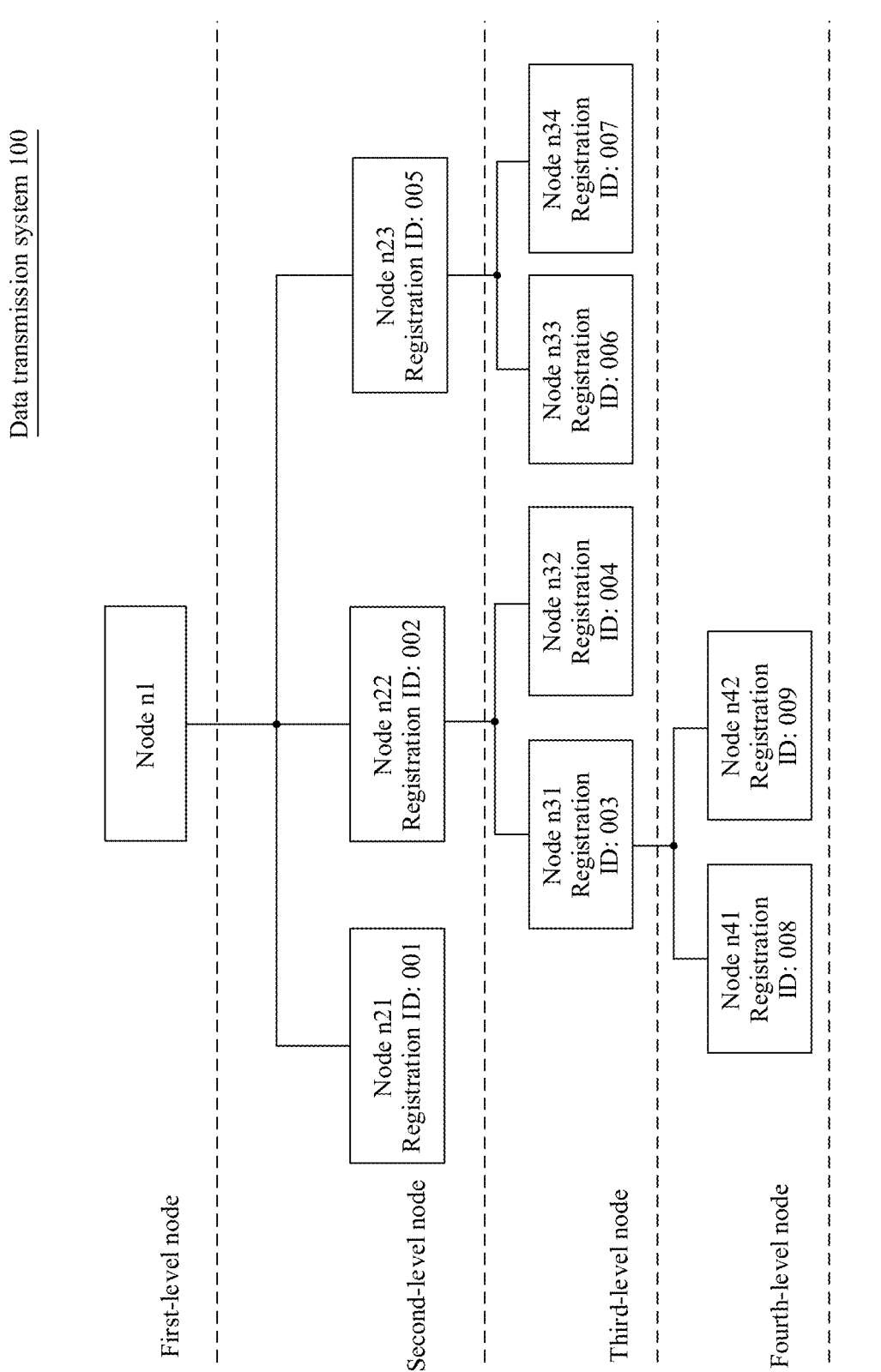
FIG. 1 is a diagram of an architecture of a power line communication system according to an embodiment of this application.

The following clearly and completely describes technical solutions in embodiments of this application with reference to accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

"First" or "second" and similar terms referred herein do not indicate any order, quantity or significance, but are only used to distinguish between different parts. Similarly, "one", "a", and similar terms also do not indicate a quantity limitation, but indicates that there is at least one. "Coupling" and similar terms are not limited to a direct physical or mechanical connection, but may include an electrical connection. Regardless of direct or indirect, "coupling" is equivalent to a connection in a broad sense.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a particular manner. In descriptions of embodiments of this application, unless otherwise stated, "a plurality of" means two or more than two. For example, a plurality of nodes means two or more nodes.

A power line communication system provided in embodiments of this application may be applied to a plurality of communication scenarios. The power line communication system provided in embodiments of this application may be physical layer communication. The power line communication system in embodiments of this application may include a plurality of nodes, and the plurality of nodes may be divided into a plurality of levels, for example, a first-level node, a second-level node, a third-level node, and a fourth-level node. The first-level node may also be referred to as a source node, a power line node, or a master control node. For example, the first-level node may be a gateway device, a server in a local area network, or a master control device. When a second-level node is followed by the connection of more levels of nodes (such as the third-level node and the fourth-level node), the second-level node may be, for example, a switch or a router. When the second-level node is a last-level node, the second-level node may be, for example, a terminal device. Similarly, when a third-level node is followed by the connection of more levels of nodes, the third-level node may be, for example, a switch or a router; and when the third-level node is a last-level node, the third-level node may be, for example, a terminal device. The terminal device may include, for example, but is not limited to, various types of portable devices such as a mobile phone, a PC-end computer, a tablet computer, a notebook computer, or a wearable device (for example, a smartwatch, an AR device, or a VR device). It should be noted that a plurality of second-level nodes may be followed by the connection of a first-level node. Among the plurality of second-level nodes, some second-level nodes may be last-level nodes, and some second-level nodes may be followed by the connection of a third-level node. Similarly, a plurality of third-level nodes may be followed by the connection of a second-level node, and a plurality of fourth-level nodes may be followed by the connection of each third-level node. In this case, the plurality of nodes are connected through a power line.

In addition, the source node in this embodiment of this application may be a node that is in a power line communication system and that encapsulates upper-layer data based on a preset frame structure (for example, the frame structure shown in FIG. 2) and that sends an encapsulated data frame, for example, the first-level node. The source node is further configured to configure identification information of at least one destination node of current multicast in a bit mapping manner, and carry bitmap information in a bitmap field shown in FIG. 2. The destination node in this embodiment of this application may be at least some nodes in the power line communication system except the source node.

In a conventional technology, when the source node transmits data to a plurality of destination nodes in a network, the data is usually transmitted in a multicast manner. When the data is transmitted in the multicast manner, a multicast group needs to be created first, and then the data is transmitted to a node in the multicast group. Generally, in a process of establishing the multicast group, the source node needs to send, to a plurality of nodes that become members of the multicast group, information indicating to establish the multicast group, and waits for feedback information of each of the plurality of nodes. When one node does not send the feedback information, the source node repeatedly sends, for a plurality of times, the information indicating to establish the multicast group. As a result, creation of the multicast group takes a long time and occupies a large amount of bandwidth. During the creation of the multicast group, no service data is transmitted, resulting in a serious bandwidth waste. In addition, after the multicast group is created, nodes in the multicast group cannot be flexibly changed. When a source node needs to transmit the data to a plurality of nodes except the multicast group, a new multicast group needs to be created. However, due to a limited resource capability, the quantity of multicast groups cannot be increased without limitation. When the quantity of multicast groups reaches an upper limit and a new multicast group needs to be added, one of the multicast groups needs to be removed. In a process of removing one of the multicast groups, the source node also needs to interact with the nodes in the multicast group for a plurality of times (for example, the source node sends information indicating removal of a node, the node periodically replies feedback, and the source node sends information indicating removal confirmation of a node). This also occupies bandwidth and causes a large bandwidth waste.

According to the power line communication system provided in this embodiment of this application, a bitmap field is added to a frame structure, and the bitmap field indicates a node that reads service data in a data frame, so that a source node (which may also be referred to as a master control node or a transmit end, for example, a node n1 in FIG. 1) may broadcast the data frame to a node in a network based on a pre-established network topology structure. In this case, when transmitting the data frame to a plurality of nodes in the network, the source node may not need to establish a multicast group, that is, does not need to interact with a plurality of nodes for a plurality of times before the service data is sent, and may directly broadcast the data frame to the node in the network. Compared with a conventional technology in which a multicast group is created in a multicast manner, embodiments of this application improve bandwidth utilization in the network. In addition, compared with a conventional technology in which a node in a multicast group cannot be flexibly changed, embodiments of this application can specify any node in the power line communication system to receive the data frame, and improve flexibility of data transmission.

In addition, when a new node joins the power line communication system, and the source node needs to transmit data to a plurality of nodes including the newly joined node, the source node may not need to change a frame structure, and only needs to allocate a registration ID to the newly joined node based on usage of the registration ID, that is, the source node can complete mapping between bits in the bitmap field and the new node by performing a small amount of interaction with the newly joined node, the newly joined node may read the data frame based on a mapping relationship between a bit in the bitmap field and the registration ID. Compared with the conventional technology in which a new multicast group needs to be created when a new node joins, embodiments of this application can greatly simplify a node interaction procedure, and reduce a bandwidth waste.

With reference to FIG. 1, the following describes in detail the power line communication system provided in embodiments of this application. FIG. 1 is a diagram of a structure of a power line communication system 100 according to an embodiment of this application. In FIG. 1, the power line communication system 100 schematically shows four levels of nodes. A first-level node includes a node n1, a second-level node includes a node n21 and a node n22, a third-level node includes a node n31, a node n32, a node n33, and a node n34, and a fourth-level node includes a node n41 and a node n42. The node n31 and the node n32 access the node n22, the node n33 and the node n34 access a node n23, and the node n41 and the node n42 access the node n31. All levels of nodes in the power line communication system 100 are connected to each other through a power line network, to exchange data through a power line. It may be understood that the power line communication system 100 may include more levels of nodes, and each level may include more nodes. This is not limited in embodiments of this application. In this embodiment of this application, the node n1 may also be referred to as a source node or a master control node, and is configured to manage other nodes to access or exit the power line network. In one embodiment, when the remaining nodes need to access the power line network, the remaining nodes need to apply to the node n1 for registration. The node n1 allocates a registration ID to each node that applies for registration, and then broadcasts the registration ID of each node to any node in the power line network. In this case, each node in the power line network has a corresponding registration ID, and registration IDs of the nodes are different. In addition, when a node exits the power line network, the node n1 is notified, and the node n1 broadcasts, to any node in the power line network, a signal indicating that the node exits the power line network.

The following describes management on each node in the power line communication system 100 by the node n1 with reference to a particular scenario. After the node n21, the node n22, the node n31, and the node n32 access the power line network, each of the node n21 and the node n22 applies to the node n1 for a registration ID based on a PLC communication protocol. The node n1 allocates a registration ID number 001 to the node n21, and allocates a registration ID number 002 to the node n22. Both the node n31 and the node n32 communicate with the node n1 through the node n22, to apply to the node n1 for registration IDs. The node n1 allocates a registration number 003 and a registration number 004 to the node n31 and the node n32 respectively.

On the basis that the node n21, the node n22, the node n31, and the node n32 are all registered, when the node n23, the node n33, the node n34, the node n41, and the node n42 access the power line network, the node n23 applies to the node n1 for a registration ID based on the PLC communication protocol. The node n1 allocates a registration ID number 005 to the node n21. Both the node n33 and the node n34 communicate with the node n1 through the node n23, to apply to the node n1 for registration IDs. The node n1 allocates a registration number 006 and a registration number 007 to the node n33 and the node n34 respectively. Both the node n41 and the node n42 communicate with the node n1 through the node n31 and the node n21, to apply to the node n1 for registration IDs. The node n1 allocates a registration number 006 and a registration number 007 to the node n41 and the node n42 respectively. In this case, the registration ID of each node is shown in FIG. 1.

Figure 2:
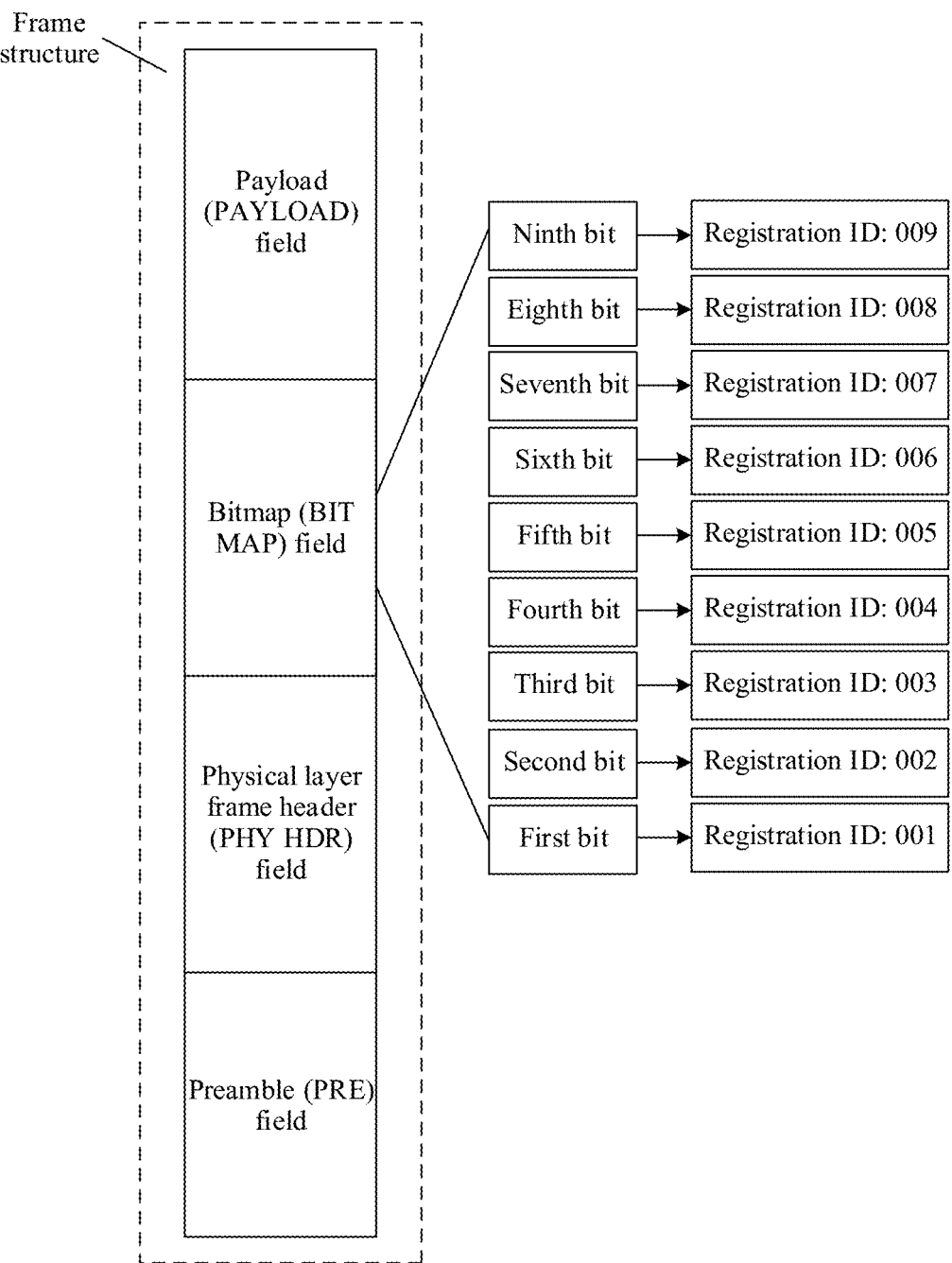
FIG. 2 is a diagram of a frame structure applied to a power line communication system according to an embodiment of this application.

Based on the power line communication system 100 shown in FIG. 1, in this embodiment of this application, when the node n1 needs to transmit data to some nodes, the node n1 may encapsulate the data based on a preset frame structure, generate a data frame, and transmit the data frame to each second-level node through the power line. FIG. 2 schematically shows a frame structure according to this embodiment of this application. As shown in FIG. 2, the frame structure includes a preamble field, a physical layer frame header field, and a payload field. The preamble field indicates a receive end to perform frame delimitation and frame synchronization on the received data frame. The physical layer frame header field is used to carry a modulation parameter, and the modulation parameter may be, for example, a modulation order. In addition, information carried in the physical layer frame header field may further include information such as a length of a data frame, and an identifier, an address, or a port number of a source node used to send the data frame. The payload field is used to carry service data. The service data herein may be, for example, data generated by encapsulating and encoding, at an application layer, a transport layer, a data link layer, and a physical layer, data such as audio data and video data that are input by a user through an application.

In addition to the foregoing signal, the frame structure shown in this embodiment of this application further includes a bitmap field. The bitmap field is used to carry identification information that is of at least one destination node of current multicast and that is configured by the source node, namely, a registration ID number. The following describes the bitmap field in detail. The bitmap field may include a plurality of bits, and there is a mapping relationship between a bit in the bitmap field and a registration ID number. Therefore, one bit corresponds to one registration node. In addition, each bit includes two types of signals: a signal "1" and a signal "0". The source node may set a bit that is in the bitmap field and that corresponds to a node that needs to receive a data frame to "1", and set other bits to "0". It may be understood that, in another possible implementation, the destination node may alternatively set a bit that is in the bitmap field and that corresponds to a node that needs to receive a data frame to "0", and set other bits to "1". This is not limited in embodiments of this application. For example, the power line communication system 100 shown in FIG. 1 includes nine registration nodes, and the bitmap field may include nine bits. According to a sending sequence of bit signals, a first bit corresponds to a registration ID number 001, a second bit corresponds to a registration ID number 002, a third bit corresponds to a registration ID number 003, . . . , and a ninth bit corresponds to a registration ID number 009. It can be seen from the power line communication system 100 shown in FIG. 1 that, the registration ID number 001 corresponds to the node n21, the registration ID number 002 corresponds to the node n22, . . . , and the registration ID number 009 corresponds to the node n42. That is, a mapping relationship between each bit in the bitmap field and a registration node is shown in FIG. 2. It is assumed that nodes that need to receive a data frame are the node n21, the node n31, and the node n23. In this case, the node n1 may set the first bit, the third bit, and the fifth bit to "1", and set the other bits to "0".

In the frame structure shown in FIG. 2, when a bit stream is sent, for example, the preamble field may be sent by using one or more independent symbols through independent modulation, the physical layer frame header field may be sent by using one or more independent symbols through independent modulation, the bitmap field may be sent by using one or more independent symbols through independent modulation, and the payload field may be sent by using a plurality of independent symbols. It should be noted that FIG. 2 is only an example of the frame structure, and is unused to limit a solution. For example, in another possible implementation, the bitmap field indicating the mapping relationship between the bit and the registration ID and the payload field used to carry service data may be encoded in a same field. That is, a signal carried in the bitmap field and a signal carried in the payload field are modulated together, and are sent by using a plurality of common symbols. For another example, the bitmap field and the physical layer frame header field may be encoded together in a same field. That is, a signal carried in the bitmap field and a signal carried in the physical layer frame header field are modulated together, and are sent by using a plurality of common symbols.

In the power line communication system 100 provided in this embodiment of this application, the bitmap field is added to a frame structure, to establish the mapping relationship between each bit in the bitmap field and the registration ID, so that the source node may set, based on a registration ID of the destination node, a bit that is in the bitmap field and that corresponds to the destination node to "1", set other bits to "0", and broadcast a data frame to a node in a network based on a pre-established network topology structure. In this case, when transmitting the data frame to a plurality of nodes in the network, the source node may not need to establish a multicast group, that is, does not need to interact with a plurality of nodes for a plurality of times before the service data is sent, and may directly broadcast the data frame to the node in the network. Compared with a conventional technology in which a multicast group is created in a multicast manner, embodiments of this application improve bandwidth utilization in the network. In addition, compared with a conventional technology in which a node in a multicast group cannot be flexibly changed, embodiments of this application can specify any node in the power line communication system to receive the data frame, and improve flexibility of data transmission.

Based on the power line communication system 100 shown in FIG. 1 and the frame structure shown in FIG. 2, in one embodiment of this application, in the frame structure shown in FIG. 2, a length of a bit in the bitmap field may be a fixed value, and the length of the bit in the bitmap field is the same as a quantity of registration IDs, that is, a maximum quantity of nodes that can be accessed in the power line communication system is the same. For example, a maximum of 250 nodes can be accessed in the power line communication system 100. In this case, 250 registration IDs may be preset in the power line communication system 100, that is, a quantity of bits in a corresponding bitmap field is 250. It may be understood that a quantity of nodes accessed in the power line communication system 100 is not necessarily a maximum value. For example, 20 registration nodes, 30 registration nodes, and the like may be accessed in the power line communication system 100. In one embodiment, if a new node accesses the power line communication system, the source node may detect whether an unused registration ID exists, and if yes, allocate the unused registration ID number to the new node; or if no, reclaim a registration ID number of a device that is powered down or exits the network, to allocate the registration ID number to the newly joined node. The following provides description in a scenario shown in FIG. 3.

Based on the power line communication system 100 shown in FIG. 1, after a node n34 exits a power line network (for example, being powered down or disconnected), a node n1 may detect that the node n34 exits the power line network. When a node n35 accesses the power line network, the node n35 sends a signal s1 to the node n1 based on a PLC communication protocol, where the signal s1 indicates an application for a registration ID. In this case, the node may perform the following operations.

Operation 301: In response to the signal s1 sent by the node n35, detect whether an unused registration ID exists. When it is detected that a registration ID number 010 is unused, operation 302 is performed; and when it is detected that no unused registration ID number exists, operation 303 is performed.

Operation 302: Allocate the registration ID number 010 to the node n35.

Operation 303: Detect whether a node whose exit time exceeds a preset threshold and that still reserves a registration ID number exists in the PLC network. When it is detected that a node whose exit time exceeds the preset threshold and that still reserves the registration ID number does not exist, the registration ID number is refused to be allocated to the node n35; and when it is detected that exit time of the node n34 exceeds the preset threshold and the node n34 still reserves a registration ID number, operation 304 is performed.

Operation 304: Deregister a registration ID of the node n34, and allocate a registration ID number 007 to the node n35.

Operation 305: Send the node n35 and the registration ID number corresponding to the node n35 to a node n23, so that the node n23 stores the node n35 and the registration ID number corresponding to the node n35 to a relay table. Because the node n35 is connected to the node n23 and serves as a third-level node of the node n23, when performing relay forwarding of a data frame, the node n23 may determine, based on a bit corresponding to a corresponding registration ID in the bitmap field, whether the node n35 needs to receive data, and forward the data when the node n35 needs to receive the data.

Figure 3:
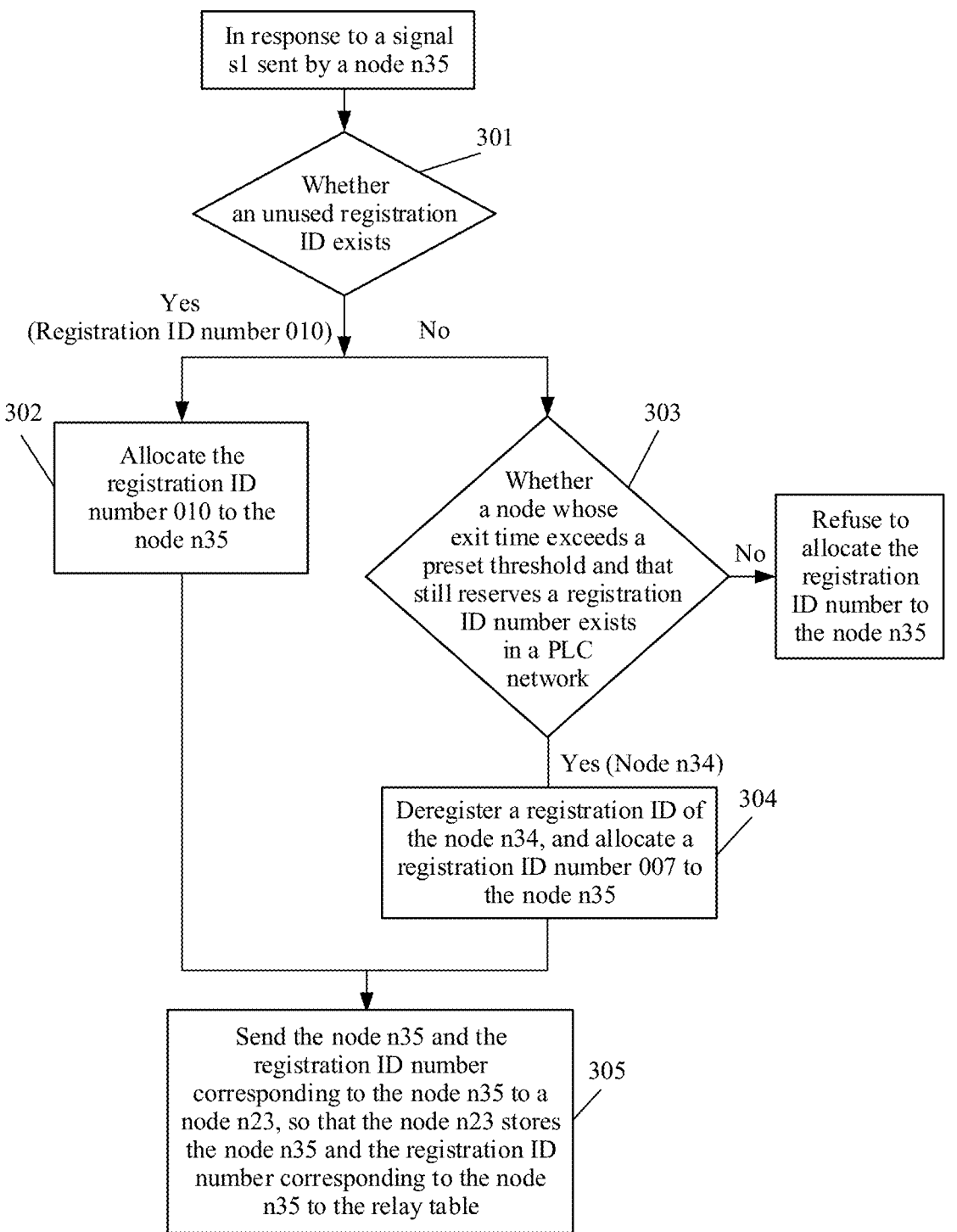
FIG. 3 is a diagram of an application scenario applied to a power line communication system according to an embodiment of this application.

It can be seen from the scenario example of allocating a registration ID to a newly joined node shown in FIG. 3 that, when a new node joins the power line communication system 100 and the source node needs to transmit data to a plurality of nodes including the newly joined node, the source node may not need to change a frame structure, and only needs to allocate a registration ID to the newly joined node based on usage of the registration ID, that is, the source node can complete the mapping between the bitmap field and the new node through a small amount of interaction with the new node, and the new node can read the data frame based on the mapping relationship between the bitmap field and the registration ID. Compared with the conventional technology in which a new multicast group needs to be created when a new node joins, embodiments of this application can greatly simplify a node interaction procedure, and reduce a bandwidth waste.

Based on the power line communication system 100 shown in FIG. 1 and the frame structure shown in FIG. 2, in one embodiment of this application, in the frame structure shown in FIG. 2, a length of a bit in a bitmap field may also change, and the length of the bit may be dynamically adjusted based on a quantity of registration nodes in the power line communication system. That is, the bitmap field may be a variable-length field. For example, 20 nodes are currently accessed in the power line communication system 100. If 250 bits are set in the bitmap field, 230 bits are not mapped to a node. If the data frame includes the 230 bits, a severe bandwidth waste is caused, and transmission duration is further occupied for transmitting the 230 useless bits. Based on this, a quantity of bits in the bitmap field may be reduced. For example, a quantity of bits may be set to 25, and set five redundant bits for a subsequently newly accessed node to use. In addition, when a quantity of accessed nodes in the power line communication system 100 increases, for example, from 20 nodes to 50 nodes, a quantity of bits in the bitmap field may be increased, to indicate whether more nodes need to receive a data frame. In one embodiment, if the quantity of bits in the bitmap field changes, the node n1 may broadcast the length of the bitmap field and the registration ID corresponding to each bit to each registration node in the power line communication system 100. In this case, during data transmission in a next periodicity, the node n1 may transmit data by using a frame structure whose bitmap field is changed, to indicate whether each node needs to read service data in a data frame.

Figure 4:
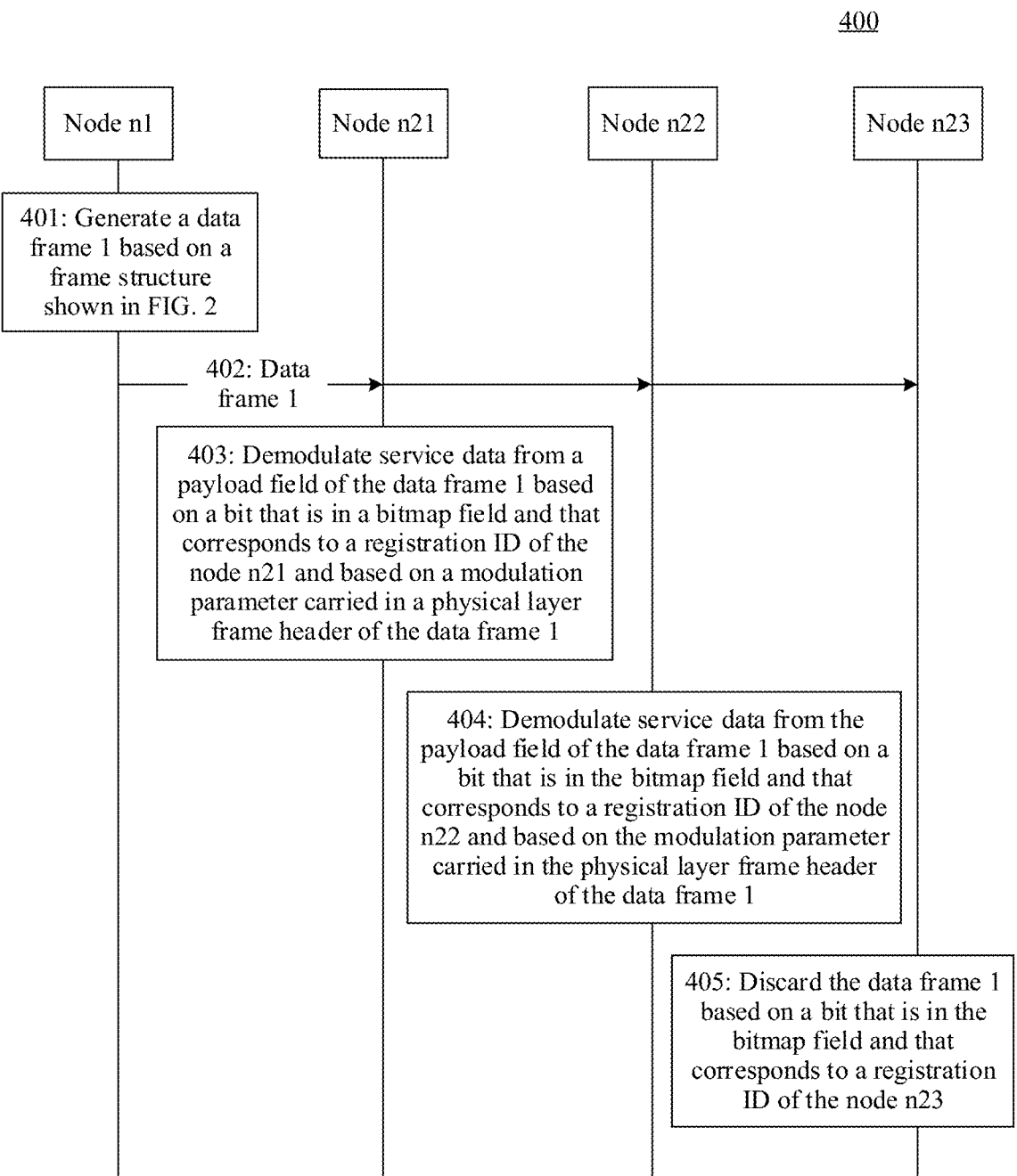
FIG. 4 is a flowchart of a data transmission method according to an embodiment of this application.

Based on the power line communication system 100 shown in FIG. 1 and the frame structure shown in FIG. 2, the following describes, with reference to FIG. 4, a data transmission method provided in an embodiment of this application by using an example in which a node n1 transmits a data frame 1 to a node n21 and a node n22. FIG. 4 is a procedure 400 of a data transmission method according to an embodiment of this application. The data transmission method is applied to the power line communication system 100 shown in FIG. 1. The data transmission method includes the following operations.

Operation 401: The node n1 generates the data frame 1 based on the frame structure shown in FIG. 2. The data frame 1 includes a bitmap field, and the bitmap field indicates the node n21 and the node n22 to receive the data frame 1. In other words, in this operation, the node n1 sets bits that are in the bitmap field and that correspond to the node n21 and the node n22 to "1", and sets bits corresponding to other nodes to "0", that is, based on a signal sending sequence, a signal of the bitmap field is "1100000". The node n1 sets a service to a payload field in the frame structure, and then adds a preamble field and a physical layer frame header field, to generate the data frame 1. Operation 402: The node n1 transmits the data frame 1 to the node n21, the node n22, and a node n23 through a power line. In this operation, because the node n21, the node n22, and the node n23 are connected to the node n1 through the same power line, the node n1 sends the data frame 1 once through the power line, and the node n21, the node n22, and the node n23 can all receive the data frame 1, that is, the node n1 broadcasts the data frame 1 through the power line.

Operation 403: The node n21 demodulates the service data from the payload field of the data frame 1 based on the bit that is in the bitmap field and that corresponds to a registration ID of the node n21 and based on a modulation parameter carried in the physical layer frame header of the data frame 1. In this operation, the node n21 may query, based on a sequence of bits received in the bitmap field, a signal of the bit corresponding to the registration ID of the node n21. It can be seen from FIG. 1 and FIG. 2 that the registration ID of the node n21 is 001, and the bit that is in the bitmap field and that corresponds to the node n21 is a first bit. A signal of the first bit is "1", that is, the node n21 needs to read the service data in the data frame 1, to transmit the service data to an upper layer (for example, a data link layer) of the node n21. In this case, the node n21 demodulates the service data from the payload field in the data frame 1 based on the modulation parameter carried in the physical layer frame header of the data frame 1.

Operation 404: The node n22 demodulates the service data from the payload field of the data frame 1 based on the bit that is in the bitmap field and that corresponds to a registration ID of the node n22 and based on the modulation parameter carried in the physical layer frame header of the data frame 1. In this operation, the node n22 queries, based on the sequence of bits received in the bitmap field, that a signal of a second bit is "1", that is, the node n22 needs to read the service data in the data frame 1. In this case, the node n22 demodulates the service data from the payload field in the data frame 1 based on the modulation parameter carried in the physical layer frame header of the data frame 1.

Operation 405: The node n23 discards the data frame 1 based on a bit that is in the bitmap field and that corresponds to a registration ID of the node n23. In this operation, the node n23 queries, based on the sequence of bits received in the bitmap field, that a signal of a fifth bit is "0", that is, the node n23 does not need to read the service data in the data frame 1. In this case, the node n23 discards the data frame 1.

Based on the data transmission method shown in FIG. 3, it should be noted that a sequence of the foregoing operations is not limited in embodiments of this application. For example, operation 403, operation 404, and operation 405 may be performed simultaneously. In addition, based on the operations included in the data transmission method 300 shown in FIG. 3, the data transmission method 300 may further include more or fewer operations. For example, in operation 403, the node n21 may further detect, based on a length of the data frame 1 indicated in the physical layer frame header field, whether the data frame 1 is complete, and when the node n21 detects that the length of the data frame 1 indicated in the physical layer frame header field is the same as the length of the received data frame 1, the node n21 reads the service data from the payload field in the data frame 1. In addition, after operation 403, the following operation may be further included: The node n21 transmits feedback information f1 to the node n1, where the feedback information f1 indicates that the node n21 successfully reads the data. For another example, operation 403 may be replaced with the following operation: The node n21 detects, based on the length of the data frame 1 indicated in the physical layer frame header field, whether the length of the data frame 1 indicated in the physical layer frame header field is the same as the length of the received data frame 1; and when the node n21 detects that the length of the data frame 1 indicated in a physical layer frame header signal is different from the length of the received data frame 1, the node n21 transmits feedback information f2 to the node n1, where the feedback information f2 indicates the node n1 to retransmit the data frame 1. After the replaced operation, the following operation may be further included: The node n1 retransmits the data frame 1 to the node n21 based on the feedback information f2. It should be further noted that, in this embodiment of this application, the node n21 may transmit the feedback information to the node n1 in a preset frame format. The preset frame format may include, for example, the preamble field and the physical layer frame header field shown in FIG. 2. The node n21 may set, in the physical layer frame header field, the feedback information indicating whether the data frame 1 is successfully received.

Figure 5:
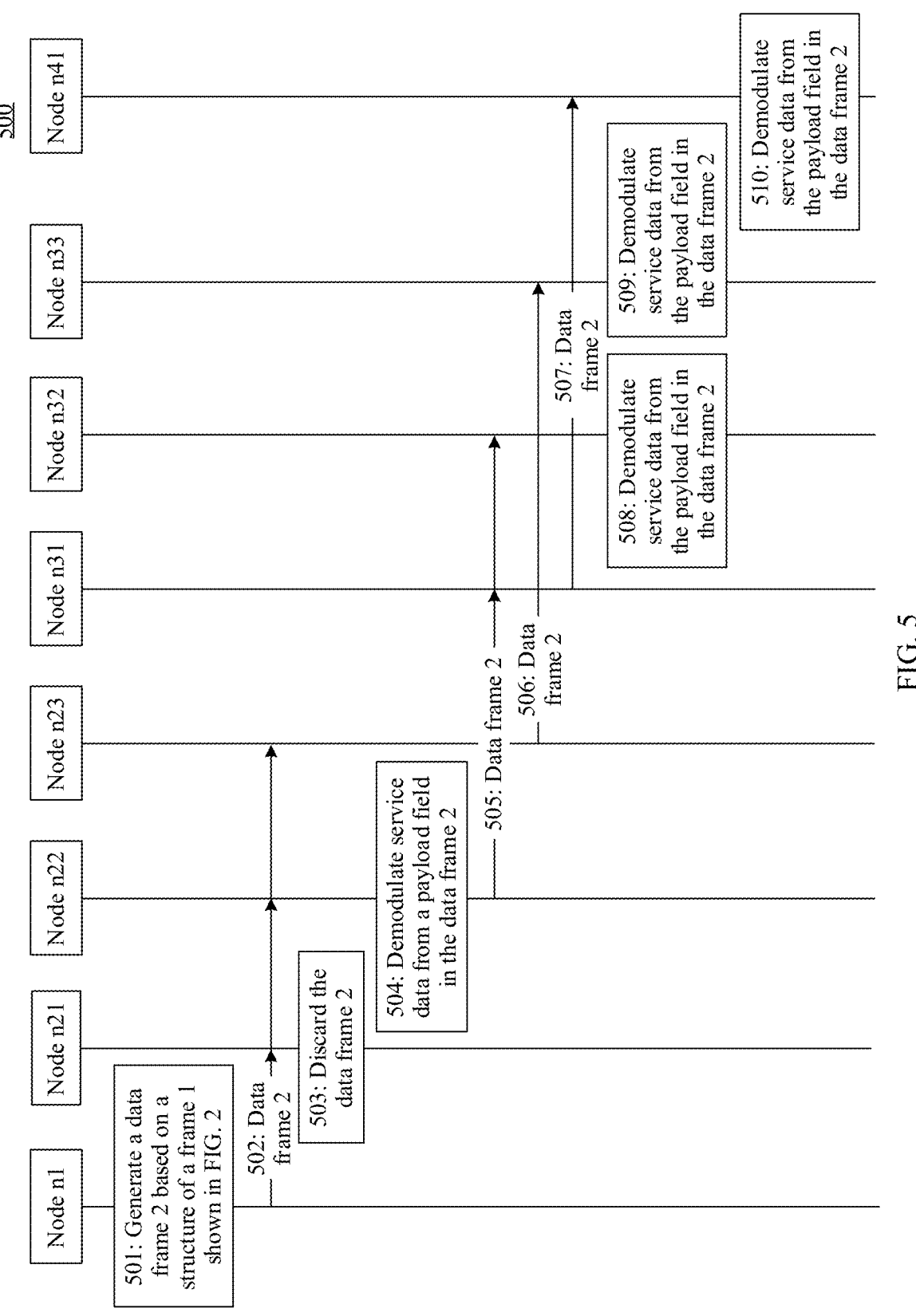
FIG. 5 is a flowchart of another data transmission method according to an embodiment of this application.

In the data transmission method 400 shown in FIG. 4, the node n1 schematically shows that some second-level nodes directly connected to the node n1 are destination nodes. In another possible implementation, the destination node may include four levels of nodes. The following describes this implementation with reference to FIG. 1, FIG. 2, and FIG. 5 by using an example in which the destination nodes are the node n22, the node n31, the node n33, and the node n41 shown in FIG. 1. FIG. 5 is a flowchart of a data transmission method 500 according to an embodiment of this application. The data transmission method 500 is applied to the power line communication system 100 shown in FIG. 1. The data transmission method 500 includes the following operations.

Operation 501: A node n1 generates a data frame 2 based on the frame structure shown in FIG. 2. The data frame 2 includes a bitmap field, and the bitmap field indicates n22, a node n32, and the node n33 to read data in the data frame 2. In this operation, the node n1 sets bits that are in the bitmap field and that correspond to n22, the node n31, and the node n33 to "1", and sets bits corresponding to other nodes to "0", in other words, based on a signal sending sequence, a signal of the bitmap field is "0110010". The node n1 carries service data to a payload field in the frame structure, and then adds a preamble field and a physical layer frame header field, to generate the data frame 2. Operation 502: The node n1 transmits the data frame 2 to a node n21, the node n22, and a node n23 through a power line. In this operation, because the node n21, the node n22, and the node n23 are connected to the node n1 through the same power line, the node n1 sends the data frame 2 once through the power line, and the node n21, the node n22, and the node n23 can all receive the data frame, that is, the node n1 broadcasts the data frame 2 through the power line.

Operation 503: The node n21 discards the data frame 2 based on a bit that is in the bitmap field and that corresponds to a registration ID of the node n21. In this operation, the node n21 queries, based on a sequence of bits received in the bitmap field, that a signal of a first bit is "0". In this case, the node n21 discards the data frame 2.

Operation 504: The node n22 demodulates service data from the payload field of the data frame 2 based on the bit that is in the bitmap field and that corresponds to the registration ID of the node n21 and based on a modulation parameter carried in the physical layer frame header of the data frame 2. In this operation, the node n22 queries, based on the sequence of bits received in the bitmap field, that a signal of a second bit is "1". In this case, the node n21 demodulates service data from the payload field in the data frame 2 based on the modulation parameter carried in the physical layer frame header of the data frame 2. Operation 505: The node n22 forwards the data frame 2 to each of the node n31 and the node n32 based on a bit that is in the bitmap field and that corresponds to a registration ID of the node n32 and a bit that is in the bitmap field and that corresponds to a registration ID of a node n41. The node n22 may store a relay table, where the relay table records multi-level nodes connected to the node n22 and a registration ID corresponding to each node. The relay table may be pre-stored in the node n22 based on a network topology structure in the power line communication system 100. As shown in FIG. 1 and FIG. 2, the relay table stored by the node n22 records the node n31, a registration ID corresponding to the node n31, the node n32, the registration ID corresponding to the node n32, the node n41, the registration ID corresponding to the node n41, a node n42, and a registration ID corresponding to the node n42. Based on the relay table, the node n22 continues to query bits that are in the bitmap field and that correspond to the registration ID of the node n31, the registration ID of the node n32, the registration ID of the node n41, and the registration ID of the node n42. In FIG. 2, a bit corresponding to the registration ID of the node n31 is a third bit, the bit corresponding to the registration ID of the node n32 is a fourth bit, the bit corresponding to the registration ID of the node n41 is an eighth bit, and a bit corresponding to the registration ID of the node n42 is a ninth bit. The node n22 queries, based on a sequence of bits received in the bitmap field, that a signal of the third bit is "0", a signal of the fourth bit is "1", a signal of the eighth bit is "1", and a signal of the ninth bit is "0", that is, the node n31 and the node n41 need to receive the data frame 2. Because the node n41 is a next-level node of the node n31, although the node n31 does not need to receive the data frame 2, the node n31 needs to forward the data frame to the node n41. In this case, the node n22 forwards the data frame 2 to the node 31 and the node n32. It should be noted that, because the node n31 and the node n32 are connected to the node n22 through a same power line, the node n31 and the node n32 may also receive the data frame 2. It should be further noted that operation 504 and operation 505 may be simultaneously performed.

Operation 506: The node n23 forwards the data frame 2 to the node n33 based on a bit that is in the bitmap field and that corresponds to a registration ID of the node n33. In this operation, the node n22 first determines, based on a bit that is in the bitmap field and that corresponds to a registration ID of the node n23, that the node n23 does not need to read service data in the data frame 2. The node n23 may store a relay table, where the relay table records multi-level nodes connected to the node n23 and a registration ID corresponding to each node. As shown in FIG. 1 and FIG. 2, the relay table stored by the node n23 records the node n33, the registration ID corresponding to the node n33, a node n34, and a registration ID corresponding to the node n34. The node n22 continues to query, based on the relay table, bits that are in the bitmap field and that correspond to the registration ID of the node n33 and the registration ID of the node n34. In FIG. 2, the bit corresponding to the registration ID of the node n33 is a sixth bit, and the bit corresponding to the registration ID of the node n32 is a seventh bit. The node n23 queries, based on a sequence of bits received in the bitmap field, that a signal of the sixth bit is "1" and a signal of the seventh bit is "0", that is, the node n33 needs to receive the data frame 2. In this case, the node n23 forwards the data frame 2 to the node 31. It should be noted that, because the node n33 and the node n34 are connected to the node n23 through a same power line, the node n34 may also receive the data frame 2. The node n34 directly discards the data frame 2 based on information indicated by the bitmap field in the data frame 2.

Operation 507: The node n31 forwards the data frame 2 to the node n41 based on the bit that is in the bitmap field and that corresponds to the registration ID of the node n41. In this operation, the node n31 first determines, based on the bit that is in the bitmap field and that corresponds to the registration ID of the node n31, that the node n31 does not need to read the data frame 2. The node n31 may store a relay table, where the relay table records multi-level nodes connected to the node n31 and a registration ID corresponding to each node. As shown in FIG. 1 and FIG. 2, the relay table stored by the node n31 records the node n41, the registration ID corresponding to the node n41, the node n42, and the registration ID corresponding to the node n42. The node n31 continues to query, based on the relay table, bits that are in the bitmap field and that correspond to the registration ID of the node n41 and the registration ID of the node n42. In FIG. 2, the bit corresponding to the registration ID of the node n41 is the eighth bit, and the bit corresponding to the registration ID of the node n42 is the ninth bit. The node n31 queries, based on a sequence of bits received in the bitmap field, that a signal of the eighth bit is "1" and a signal of the ninth bit is "0", that is, the node n41 needs to receive the data frame 2. In this case, the node n31 forwards the data frame 2 to the node 41.

Operation 508: The node n32 demodulates service data from the payload field of the data frame 2 based on the bit that is in the bitmap field and that corresponds to the registration ID of the node n32 and based on the modulation parameter carried in the physical layer frame header of the data frame 2.

Operation 509: The node n33 demodulates service data from the payload field of the data frame 2 based on the bit that is in the bitmap field and that corresponds to the registration ID of the node n33 and based on the modulation parameter carried in the physical layer frame header of the data frame 2.

Operation 510: The node n41 demodulates service data from the payload field of the data frame 2 based on the bit that is in the bitmap field and that corresponds to the registration ID of the node n33 and based on the modulation parameter carried in the physical layer frame header of the data frame 2.

Figure 6:
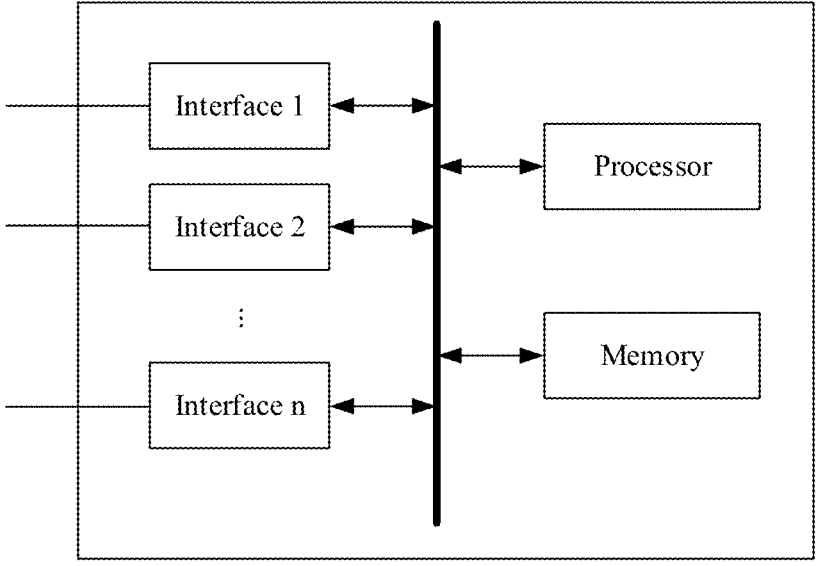
FIG. 6 is a diagram of a hardware structure of each node shown in FIG. 1 according to an embodiment of this application.

Based on the power line communication system 100 shown in FIG. 1, the frame structure shown in FIG. 2, and the data transmission methods shown in FIG. 4 and FIG. 5, in this embodiment of this application, a structure of each node in the power line communication system 100 shown in FIG. 1 may be shown in FIG. 6. In FIG. 6, the node includes a processor, a memory, and a plurality of interfaces. The processor performs various functions of the node by running or executing a software program stored in the memory and invoking instructions and data stored in the memory. The processor may include one or more modules such as a central processing unit (CPU) and a network processor (NP). The network processor may be implemented by an application-specific integrated circuit (ASIC) or a field-programmable gate array (FPGA) chip. The memory may be configured to store a software program, instructions, and data, and may be implemented by any type of volatile or non-volatile memory or a combination thereof, for example, including one or more of a static random access memory (SRAM), a dynamic random access memory (SDRAM), a double data rate synchronous dynamic random access memory (DDR), an erasable programmable read-only memory (EPROM), and a read-only memory (ROM). One node may include a plurality of interfaces, and n interfaces are schematically shown in the figure. In the plurality of interfaces, some Ethernet interfaces are configured as input ports of the node, to receive data from another node, and the other Ethernet interfaces are configured as output ports of the node, to send data to the another node.

It may be understood that, to implement the foregoing function, an interface controller includes a corresponding hardware and/or software module for performing the function. With reference to the operations of the examples described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

Figure 7:
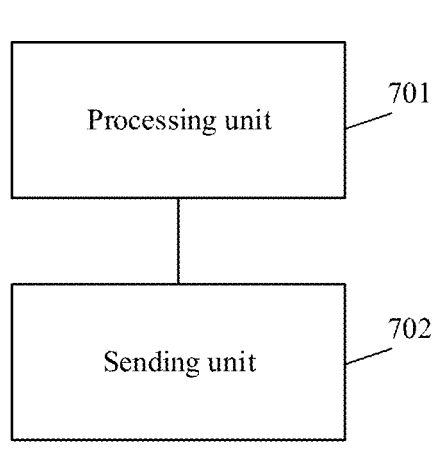
FIG. 7 is a diagram of a structure of a power line communication apparatus according to an embodiment of this application.

In this embodiment, functional module division may be performed on components included in the node n1 shown in FIG. 1 based on the foregoing method example. For example, different components may be obtained through division based on corresponding functions, or components with two or more functions may be integrated into one module. The integrated module may be implemented in a form of hardware. It should be noted that module division in embodiments is an example and is only logical function division. During actual implementation, another division manner may be used. When an integrated module is used, FIG. 7 is a possible diagram of a power line communication apparatus 700. As shown in FIG. 7, the power line communication apparatus 700 may include: a processing unit 701, configured to generate a data frame, where the data frame includes a first field, a second field, and a third field, the first field is used to carry a modulation parameter, the second field is used to carry, in a bit mapping manner, identification information that is of at least one destination node of current multicast and that is configured by the processing unit, and the third field is used to carry service data; and a sending unit 702, configured to send the data frame to a node in a power line communication network.

In a possible implementation, that a power line node configures the identification information of the at least one destination node of the current multicast is triggered based on indication information of a received higher-layer instruction, and the indication information indicates the identification information of the at least one destination node.

In a possible implementation, the second field includes a plurality of bits, there is a mapping relationship between the plurality of bits and identification information of nodes in the power line communication network, and the identification information of the node in the power line communication network is pre-allocated by the power line node to the node in the power line communication network; and the processing unit 701 is configured to: set a target bit that is in the second field and that corresponds to identification information of each of the at least one destination node as first information, where the first information indicates that the service data is read; and set any bit other than the target bit in the second field as second information, where the second information indicates that the data frame is discarded.

In a possible implementation, the processing unit 701 is further configured to separately and independently modulate a signal carried by the first field, a signal carried by the second field, and a signal carried by the third field, to generate a plurality of modulated signals; and the sending unit 702 is configured to send the plurality of modulated signals to the node in the power line communication network.

In a possible implementation, the processing unit 701 is further configured to modulate, together with a signal carried by the second field, at least one of a signal carried by the first field and a signal carried by the third field, to generate at least one modulated signal; and the sending unit 702 is configured to send the at least one modulated signal to the node in the power line communication network.

In a possible implementation, the processing unit 701 further configured to: when a length of the second field changes, send a length of the second field and an identifier that is mapped to each bit in the second field to the node in the power line communication network through the sending unit 702.

The power line communication apparatus 700 provided in this embodiment is used in a data transmission method performed by a node (for example, the node n1 shown in FIG. 1), and may achieve a same effect as the foregoing implementation method or apparatus. In one embodiment, the modules corresponding to FIG. 7 may be implemented by software, hardware, or a combination thereof. For example, each module may be implemented in a form of software, may correspond to a processor and an interface that correspond to the module in FIG. 6, and may be configured to drive the corresponding component to work. Alternatively, each module may include two parts: a corresponding component and corresponding driver software, that is, implemented by using a combination of software and hardware. Therefore, it may be considered that the power line communication apparatus 700 logically includes the interface n1 shown in FIG. 1 and the interface shown in FIG. 6, and each module includes at least a driver software program of a corresponding function. Details are not described in this embodiment.

Figure 8:
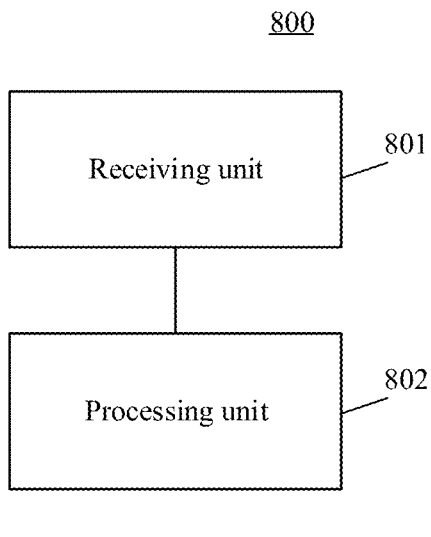
FIG. 8 is a diagram of a structure of another power line communication apparatus according to an embodiment of this application.

In this embodiment, functional module division may be performed on components included in any one of the node n21, the node n22, the node n23, the node n24, the node n31, the node n32, the node n33, the node n34, the node n41, and the node n42 shown in FIG. 1 according to the foregoing method example. For example, different components may be obtained through division based on corresponding functions, or two or more functional components may be integrated into one processor module. The integrated processor module may be implemented in a form of hardware. It should be noted that module division in embodiments is an example and is only logical function division. During actual implementation, another division manner may be used. When an integrated module is used, FIG. 8 is a possible diagram of a power line communication apparatus 800. As shown in FIG. 8, the power line communication apparatus 800 may include a receiving unit 801 and a processing unit 802, and may further extend the apparatus mentioned above. The receiving unit 801 is configured to receive a data frame from a power line node, where the data frame includes a first field, a second field, and a third field, the first field is used to carry a modulation parameter, the second field is used to carry, in a bit mapping manner, identification information that is of at least one destination node of current multicast and that is configured by the power line node, and the third field is used to carry service data. The processing unit 802 is configured to: when the second field indicates that the first node is the destination node, read the service data from the third field based on the modulation parameter.

In a possible implementation, the processing unit 802 is further configured to discard the data frame when the second field indicates that the first node is not the destination node.

In a possible implementation, the second field includes a plurality of bits, and there is a mapping relationship between the plurality of bits and identification information of nodes in the power line communication network; when a bit that is in the second field and that corresponds to identification information of the first node is first information, that the first node is the destination node is indicated; or when a bit that is in the second field and that corresponds to identification information of the first node is second information, that the first node is not the destination node is indicated.

The power line communication apparatus 800 provided in this embodiment is used in a data transmission method performed by any one of the node n21, the node n22, the node n23, the node n24, the node n31, the node n32, the node n33, the node n34, the node n41, and the node n42, and may achieve an effect the same as that of the foregoing implementation method or apparatus. In one embodiment, the modules corresponding to FIG. 8 may be implemented by software, hardware, or a combination thereof. For example, each module may be implemented in a form of software, may correspond to an interface and a processor that correspond to the module in FIG. 6, and may be configured to drive the corresponding component to work. Alternatively, each module may include two parts: a corresponding component and corresponding driver software, that is, implemented by using a combination of software and hardware. Therefore, it may be considered that the power line communication apparatus 800 logically includes any one of the node n21, the node n22, the node n23, the node n24, the node n31, the node n32, the node n33, the node n34, the node n41, and the node n42 shown in FIG. 1, or the node shown in FIG. 6, and each module includes at least a driver software program of a corresponding function. This is not described in this embodiment.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system and apparatus may be implemented in another manner. For example, the described apparatus embodiment is only an example. For example, division into the units is only logical function division and may be other division during actual implementation. For example, a plurality of units or assemblies may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium or memory includes any medium that can store program code, for example, a USB flash drive, a removable hard disk, a ROM, a RAM, a magnetic disk, or an optical disc.

Finally, it should be noted that the foregoing embodiments are only intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A data transmission method applied to power line communication, the method comprising:
   generating, by a power line node, a data frame comprising a first field, a second field, and a third field, the first field comprising a modulation parameter, the second field comprising identification information, configured by the power line node, in a bit mapping manner of at least one destination node of a current multicast, and the third field comprising service data; and
   sending, by the power line node, the data frame to a node in a power line communication network.

2. The data transmission method according to claim 1, wherein
   the power line node configures the identification information based on indication information of a received higher-layer instruction; and
   the indication information indicates the identification information of the at least one destination node.

3. The data transmission method according to claim 1, wherein
   the second field comprises a plurality of bits, and a mapping relationship exists between the plurality of bits and identification information of nodes in the power line communication network; and
   the power line node configuring the identification information of the at least one destination node of the current multicast further comprises:
      setting a target bit in the second field that corresponds to identification information of each of the at least one destination node as first information; and
      setting any bit other than the target bit in the second field as second information.

4. The data transmission method according to claim 1, wherein the sending the data frame further comprises:
   independently modulating a signal carried by the first field, a signal carried by the second field, and a signal carried by the third field, to generate a plurality of modulated signals; and
   sending the plurality of modulated signals to the node in the power line communication network.

5. The data transmission method according to claim 1, wherein the sending the data frame further comprises:
   modulating, together with a signal carried by the second field, at least one of a signal carried by the first field or a signal carried by the third field, to generate at least one modulated signal; and
   sending the at least one modulated signal to the node in the power line communication network.

6. The data transmission method according to claim 1, wherein the method further comprises:
   when a length of the second field changes, sending, by the power line node, a length of the second field and identification information mapped to each bit in the second field to the node in the power line communication network.

7. A power line communication apparatus, wherein the power line communication apparatus comprises:
   a memory; and
   a processor, that is operatively coupled to the memory, to perform the data transmission method of claim 1.

8. A non-transitory computer-readable storage medium, configured to store a computer program, wherein when the computer program is run by a processor, causes the processor to perform the data transmission method of claim 1.

9. A data transmission method applied to power line communication, the method comprising:
   receiving, by a first node in a power line communication network, a data frame from a power line node, wherein the data frame comprises a first field, a second field, and a third field, the first field comprising a modulation parameter, the second field comprising identification information, configured by the power line node, in a bit mapping manner of at least one destination node of a current multicast, and the third field comprising service data; and
   when the second field indicates that the first node is the at least one destination node, demodulating, by the first node, the service data from the third field based on the modulation parameter.

10. The data transmission method according to claim 9, wherein the data transmission method further comprises:
   discarding, by the first node, the data frame when the second field indicates that the first node is not the at least one destination node.

11. The data transmission method according to claim 9, wherein
   the second field comprises a plurality of bits, and a mapping relationship exists between the plurality of bits and identification information of nodes in the power line communication network; and
   when a bit in the second field corresponding to identification information of the first node is set as first information, the first node is indicated as the at least one destination node; or
   when a bit that is in the second field corresponding to identification information of the first node is set as second information, the first node is indicated as not the at least one destination node.

12. The data transmission method according to claim 11, wherein the first node is a relay node in the power line communication network; and the method further comprises:

reading, by the first node based on the mapping relationship, information regarding a bit in the second field and corresponds to identification information of a next-level node coupled to the relay node; and when the information regarding the bit that is in the second field and corresponds to the identification information of the next-level node is set as the first information, forwarding the data frame to the next-level node.

13. A non-transitory computer-readable storage medium, configured to store a computer program, wherein when the computer program is run by a processor, causes the processor to perform the data transmission method of claim 9.

14. A power line communication apparatus, wherein the power line communication apparatus is a first node in a power line communication network, and the power line communication apparatus comprises:

a memory;

an interface configured to receive a data frame from a power line node, wherein the data frame comprises a first field, a second field, and a third field, the first field comprising a modulation parameter, the second field comprising identification information, configured by the power line node, in a bit mapping manner of at least one destination node of a current multicast, and the third field comprising service data; and a processor, that is operatively coupled to the memory, to:

when the second field indicates that the first node is the at least one destination node, demodulate the service data from the third field based on the modulation parameter.

15. The power line communication apparatus according to claim 14, wherein the processor is further configured to:

discard the data frame when the second field indicates that the first node is not the at least one destination node.

16. The power line communication apparatus according to claim 14, wherein the second field comprises a plurality of bits, and a mapping relationship exists between the plurality of bits and identification information of nodes in the power line communication network; and when a bit in the second field corresponding to identification information of the first node is set as first information, the first node is indicated as the at least one destination node; or when a bit that is in the second field corresponding to identification information of the first node is set as second information, the first node is indicated as not the at least one destination node.

\* \* \* \* \*